United States Patent
Rafferty

[15] 3,647,171
[45] Mar. 7, 1972

[54] RESCUE DEVICE FOR LINEMEN

[72] Inventor: John E. Rafferty, 100 Holman St., Lunenburg, Mass. 01462

[22] Filed: Dec. 1, 1969

[21] Appl. No.: 881,166

Related U.S. Application Data

[63] Continuation-in-part of Ser. No. 735,014, June 6, 1968, abandoned.

[52] U.S. Cl.....................................248/221, 248/231, 182/9
[51] Int. Cl.........................................................F16m 13/00
[58] Field of Search..................248/221, 230, 231; 182/3, 9; 24/269; 52/28, 40

[56] References Cited

UNITED STATES PATENTS

| | | | |
|---|---|---|---|
| 1,653,083 | 12/1927 | Blaw | 248/231 X |
| 1,641,559 | 9/1927 | Thompson | 248/231 UX |
| 1,978,646 | 10/1964 | Oishei | 248/231 |
| 2,540,784 | 2/1951 | Hocher | 248/221 |
| 411,721 | 9/1889 | Harter | 24/269 |
| 1,952,863 | 3/1934 | Hueber | 248/231 |
| 1,547,915 | 7/1925 | Hirn | 248/221 UX |

Primary Examiner—William H. Schultz
Attorney—Rich & Ericson

[57] ABSTRACT

A device for lowering a disabled lineman from an electric pole. A portable hoist has a saddle with upper and lower flanges curved to engage the pole. A pair of spaced bars and a post portion rigidly interconnect the flanges. Adjustable strap means connected to the spaced bars secure the hoist to the pole. The post portion is adapted to carry a block and tackle with a rope leading to the ground. The hoist can be carried up by a lineman and attached to the pole at any desired height.

A rescue harness is attached to the block and tackle, and has three straps attached to a ring. Two of the straps can be hooked to the rings on a lineman's belt, and the third step passed between his legs and over one shoulder and hooked to the ring in front.

5 Claims, 8 Drawing Figures

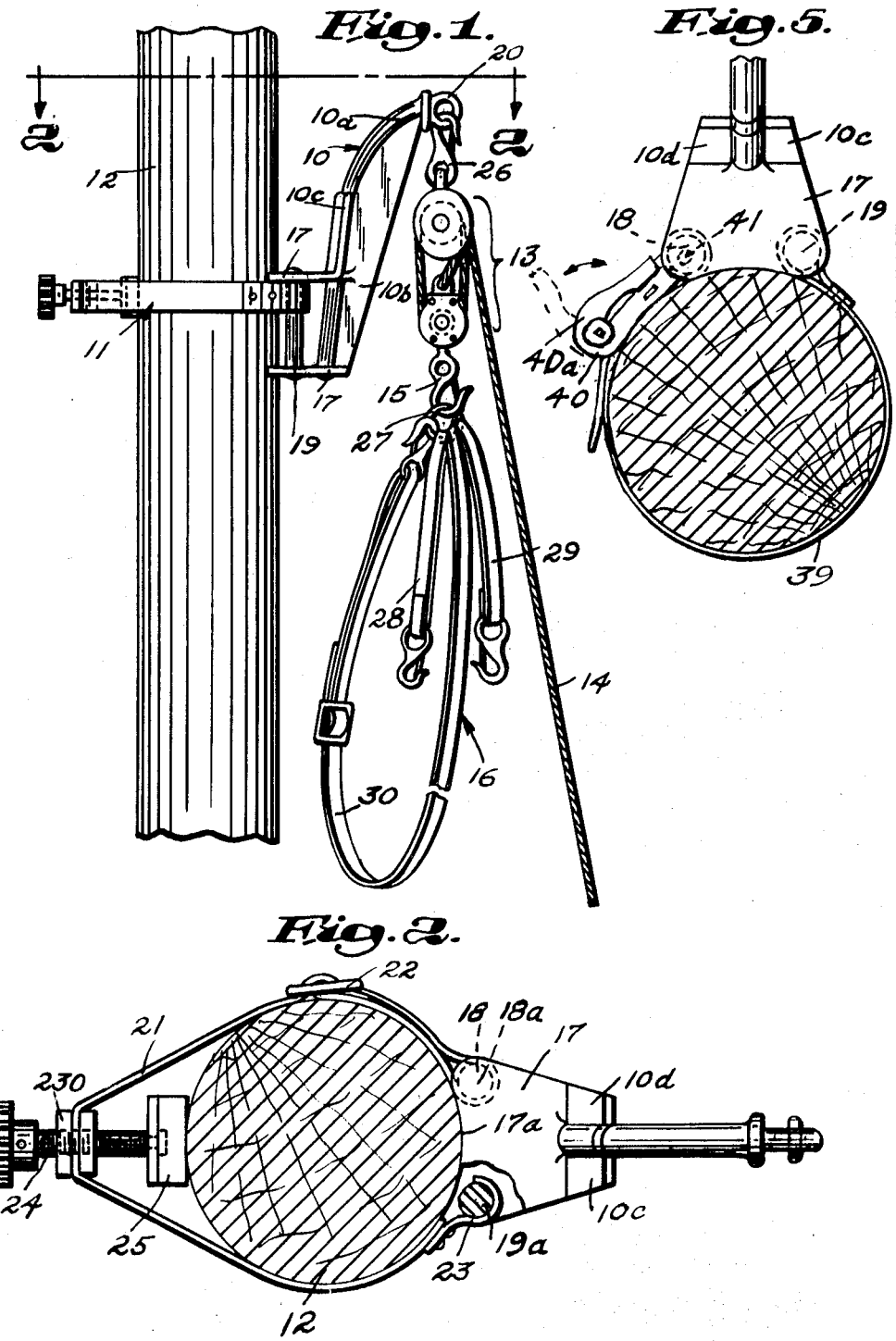

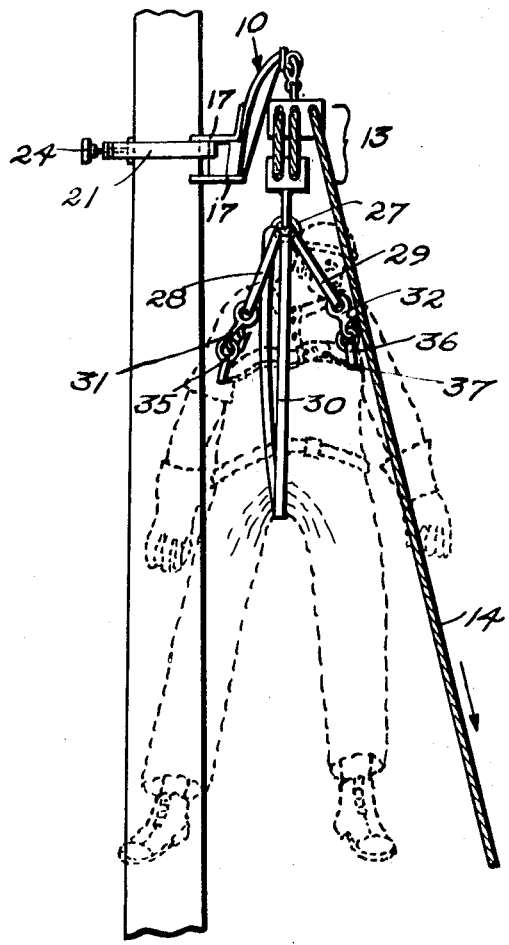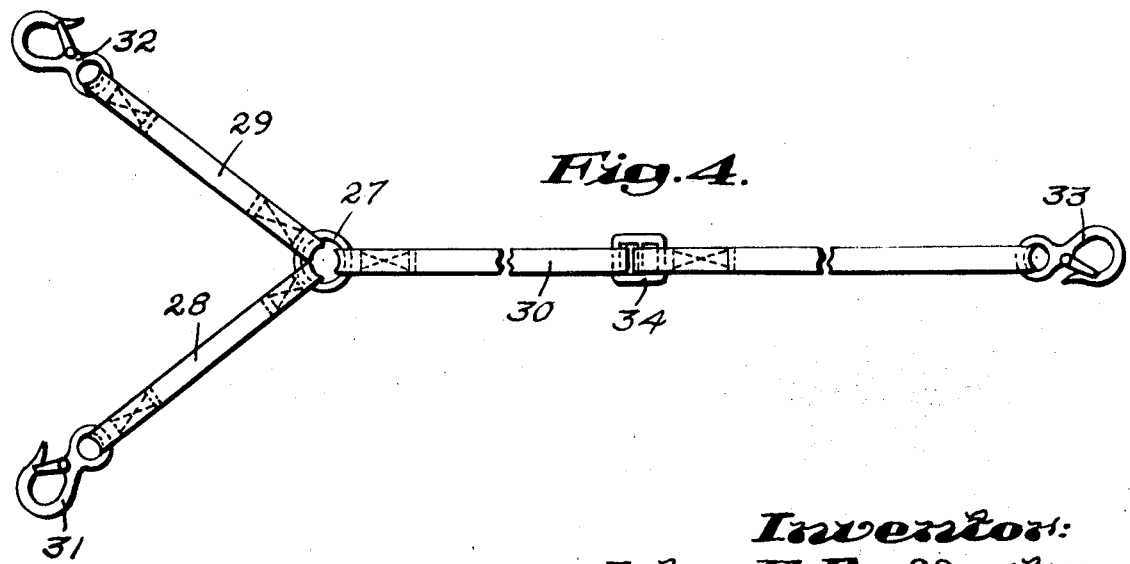

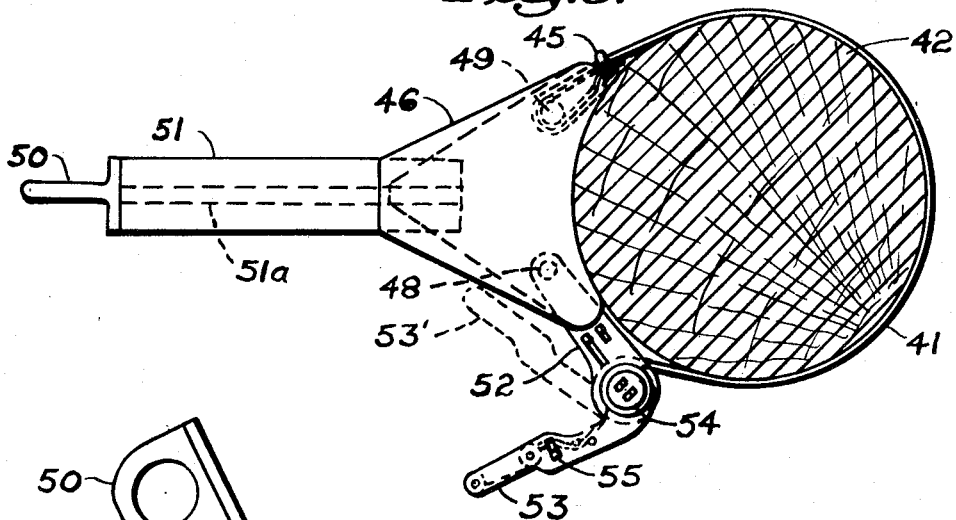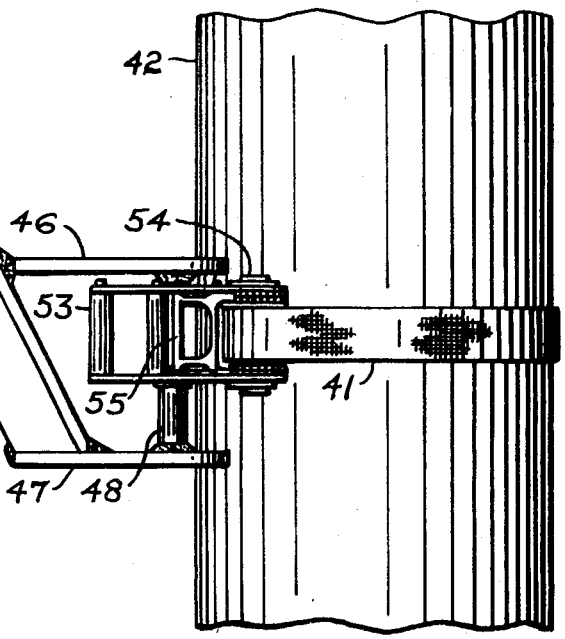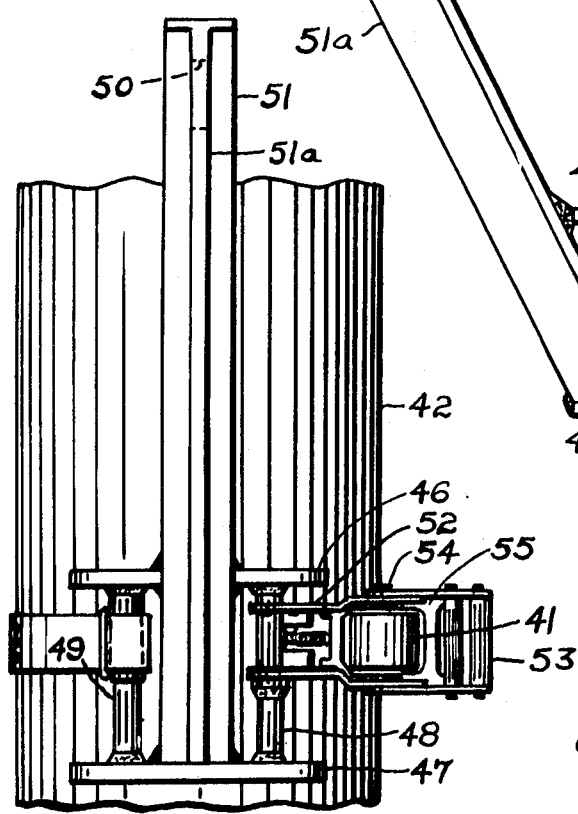

3,647,171

RESCUE DEVICE FOR LINEMEN

BACKGROUND OF THE INVENTION

This application is a continuation-in-part of my copending U.S. Pat. application, Ser. No. 735,014, filed June 6, 1968 and now abandoned.

This invention relates to devices for lowering a man from a high pole such as an electric pole, and more particularly to devices for rescuing a lineman who is unconscious or disabled. The principal hazard to linemen is electric shock from high voltage transmissions lines. In a case of serious shock, it is imperative to get the man down from the pole, and apply first aid measures such as artificial respiration and heart message, as quickly as possible. Ordinarily, linemen work in groups of three, with two men on the ground available to climb up and carry down the man working on the pole in case of accident. This practice is inefficient because, most of the time, the men on the ground have very little to do. Furthermore, even with two men available for rescue work, it is sometimes difficult to get the injured man past obstructions such as crosstrees on lines.

The principal object of this invention is to provide an improved rescue device which is of lightweight and compact but strong construction, and which can be quickly and easily attached to a pole. It is a further object of provide an improved rescue device by which a disabled man can be quickly lowered from a pole, which swings the man clear of obstacles such as wires and crosstrees, and which can be operated by one rescuer. Other objects, advantages, and novel features will be apparent from the following description.

SUMMARY

The device here disclosed is intended for use with the belt which a lineman ordinarily wears, which passes around his waist and has rings at the side to which a strap, passed around the pole is attached. It is customary for a lineman, after he has climbed to working position, to fasten himself to the pole by his belt and strap, so as to leave his hands free.

The device consists of two main elements, a hoist and a harness. The hoist is made of rigid material, such as cast aluminum, and is preferably coated with insulation. It has a saddle-shaped base portion, including two spaced flanges interconnected by a pair of bars and by a projecting post. The base engages the pole and is secured by a strap passing around the pole and attached to the bars, which is drawn tight by a ratchet handle or other tightening device. The post portion is adapted for connection to a block and tackle with a rope leading to the ground. The harness includes two short straps with snap hooks on one end, and a longer strap with a snap hook on one end. The other ends of all three straps are attached to a ring. The block and tackle has a hook which is passed through the ring.

BRIEF DESCRIPTION OF THE DRAWINGS

In the drawings illustrating the invention:

FIG. 1 is a side elevation of a rescue device constructed according to the invention mounted on a pole ready for use;

FIG. 2 is a cross section, somewhat enlarged, taken along line 2—2 of FIG. 1;

FIG. 3 is a side elevation of the device illustrated in use for lowering a man;

FIG. 4 is a plan view of the harness with the straps laid out flat;

FIG. 5 is a cross section similar to FIG. 2, illustrating a modification of the hoist attachment;

FIG. 6 is a plan view in cross section showing a modification of the hoist;

FIG. 7 is a side elevation of the hoist of FIG. 6; and
FIG. 8 is a front elevation of the hoist of FIG. 6.

DETAILED DESCRIPTION

The hoist, generally indicated by the numeral 10, is secured by a strap 11 to a pole 12. The hoist carries a block and tackle 13, controlled by a rope 14 leading to the ground, which supports a hook 15 to which the harness, generally indicated by the numeral 16, is secured.

The hoist is made of metal, preferably cast aluminum, and has flanges 17 with inner edges curved to fit the contour of the post 12. The flanges are connected together near their corners by bars 18 and 19 which may be welded or bolted to the flanges. The flanges and bars form a saddlelike base for the hoist. A post portion 10a extends above the base and terminates in an eye 20. A reinforcing rib 10b extends upward from the lower flange 17 along the base and post portions. Additional reinforcing ribs 10c and 10d extend from the upper flange 17 part way up the sides of the post portion 10a.

The bars 18 and 19 have reduced neck portions 18a and 19a. A strap 21 has one end passed around the portion 18a and secured to an adjusting buckle 22. A metal hook 23 is secured to the other end of the strap and is hooked around the portion 19a when the hoist is in place on a pole. A block 230 is secured on the strap opposite the hoist base and a bolt 24 is threaded into the block. The inner end of the bolt is captive and rotatable in a block 25 which bears on the pole. The strap 21 can be tightened on the pole by turning the bolt 24.

The block and tackle 13 is connected to the eye 20 by a snap hook 26. The harness, shown laid flat in FIG. 4, includes a ring 27, to which two short straps 28 and 29 are attached on one side and a long strap 30 is attached on the other. The straps 28 and 29 carry snap hooks 31 and 32 on their free ends, and the strap 30 carries a snap hook 33 on its free end. The strap 30 has an adjusting buckle 34. A hook 15 is snapped onto the ring 27. When the harness is not in use, the hook 33 may be snapped onto the ring 27.

The hoist and harness, assembled as shown in FIG. 1, are intended to be carried up the pole by a lineman and attached to the pole before he starts to work on the lines. To attach the hoist, he passes the strap 21 around the pole and connects the hook 23 around the portion 19a of the bar 19. The strap can be partly tightened against the pole by adjusting the buckle 22, then the bolt 24 is turned to draw the saddle portion of the hoist against the pole as tightly as possible. The hoist is preferably placed near the lineman with the post portion facing in such a direction as to clear any obstructions below, and to be out of the man's way when he is working. He then fastens the safety strap from his own belt around the pole and goes to work.

To rescue the man in case of accident, the rescuer climbs the pole and attaches the harness to the injured man. As shown in FIG. 3, the straps 28 and 29 are connected from the front by the hooks 31 and 32 to the rings 35 and 36 on the belt 37 which a lineman ordinarily wears. The safety strap (not shown), by which he attaches himself to the post while working, is attached to these rings. The strap 30 is passed between the mans's legs, up around his back and over one shoulder, and secured to the ring 27, which is in front of him, by the hook 33. The rescuer then cuts or releases the man's safety strap from the pole so that he swings free in the harness. When the injured man's weight comes onto the harness, his belt 37 tends to slide up under his arms so that he is held upright.

The harness can be raised or lowered into the right position for attaching by the rope 14 which the rescuer can reach from the post. When releasing the safety strap, he holds the free end of the rope 14. Depending on conditions, the rescuer can lower the injured man to the ground while he himself remains on the post, or he can climb down, holding the end of the rope, and lower the injured man from the ground. Alternatively, the rescuer can lower the man in the harness as he climbs down himself.

FIG. 5 illustrates another arrangement for fastening the hoist to the post. A strap 39 is attached to the bar 19. A ratchet buckle 40, of a well-known type which tightens a strap threaded through it when the handle portion 40a is pumped back and forth, and locks the strap when the handle is closed, as shown in full line, is attached to the bar 18. The strap 39 is passed around the pole, threaded through the buckle 40, and tightened to secure the hoist to the pole.

A modified hoist is shown in FIGS. 6 thru 8, secured by a strap 41 to a pole 42. The hoist is an integral welded structure, having an upper flange 46 spaced from a lower flange 47, both flanges being welded to a post portion 51 which has a reinforcing rib 51a and terminates in an eye 50 for connection to a block and tackle, as illustrated in connection with the preceding embodiments. The flanges 46 and 47 are connected to form a rigid and unitary saddlelike base by the post 51 and by spaced parallel bars 48 and 49.

The inner edges of the flanges 46 and 47 are curved to conform to a cylinder having the diameter of the post 42, so that they rest firmly against the post to mount the hoist securely. These edges mount the hoist in a position such that the bars 48 and 49 extend substantially parallel to the axis of the post 42, for attachment by the strap 41.

One end of the strap 41 is wrapped about the bar 49 and secured to itself by stitches, whose integrity is protected by sliding a metal ring 45 over the overlapping end portions of the strap and against the bar. The second end of the strap is wound about a ratcheted spindle 54 which forms a portion of a conventional ratchet buckle 52. The buckle is pivotally mounted on the bar 48, and has an operating handle 53 which may be cranked back and forth about the spindle 54 to tighten the strap around the pole 42. The buckle and strap may be locked by moving the handle to a position shown in dotted lines at 53'. The spindle 54 and the strap may be released by pressing a lever 55 which carries pawls that normally engage ratchets (not shown) mounted on the spindle to prevent reverse rotation.

The rescue device here disclosed is simple and light enough to be carried up and installed by a lineman as a matter of course every time he goes up a pole. The harness can be applied by a rescuer very quickly, and the man can be brought down for first aid treatment in the shortest possible time. In cases of electric shock, the delay incident to improvising rescue means or getting rescue equipment into position may be fatal. The present device is in place and ready for use before an accident occurs. The harness surrounds the man in such a way that he cannot fall out. The adjusting buckle 52 allows the strap 41 to be adjusted to fit men of various sizes, and the harness can be adjusted by the lineman himself before he goes up.

Even if the man to be rescued has not set the hoist in place, it can be carried up and attached to the pole by a rescuer in a very short time.

As one man can easily rescue another with this device, linemen can safely work in groups of two. This is not only more economical, but allows more effective use of skilled men in times of emergency, for example, when extensive storm damage has to be repaired.

What I claim is:

1. A rescue device for lowering a man from a high pole, comprising a portable hoist including:
    a saddle portion having spaced upper and lower flanges having curved inner edges for conformably engaging the pole, each of said curved edges extending about a substantial arcuate sector of a circle to brace said saddle against twisting with respect to said pole, said saddle portion further including a pair of spaced bars rigidly interconnecting said flanges adjacent to said inner edges; a post portion interconnecting said flanges in spaced relation to said spaced bars and projecting from said saddle portion for attachment to a rescue harness; and means for securing said saddle portion to a pole comprising adjustable strap means attached at opposite ends thereof to said bars.

2. A rescue device as recited in claim 1, said flanges, bars, and pole portion comprising a unitary welded structure.

3. A rescue device as recited in claim 1, said bars extending substantially parallel to a cylinder conformable to said curved inner edges, thereby extending substantially parallel to the axis of a pole on which said rescue device is mounted.

4. A rescue device as recited in claim 1, said strap means comprising a first strap secured to one of said bars, and a ratchet buckle secured to the other of said bars for adjustably securing a free end of said first strap.

5. A rescue device as recited in claim 1, said strap means being secured at one end to one of said bars and carrying at its other end a hook releasably engageable with the other of said bars, a first block attached to said strap means intermediate its ends, a lead screw threadedly engaged in said first block, and a second block rotatably connected to said lead screw and adapted to bear against said pole.

* * * * *